(12) United States Patent
Bixler

(10) Patent No.: US 10,167,968 B1
(45) Date of Patent: Jan. 1, 2019

(54) CHECK VALVE

(71) Applicant: Craig A. Bixler, Elmhurst, IL (US)

(72) Inventor: Craig A. Bixler, Elmhurst, IL (US)

( * ) Notice: Subject to any disclaimer, the term of this patent is extended or adjusted under 35 U.S.C. 154(b) by 0 days.

(21) Appl. No.: 15/883,423

(22) Filed: Jan. 30, 2018

(51) Int. Cl.
*F16K 15/14* (2006.01)
(52) U.S. Cl.
CPC ....... *F16K 15/147* (2013.01); *Y10T 137/7885* (2015.04)
(58) Field of Classification Search
CPC .................. F16K 15/147; Y10T 137/7885
USPC ............... 137/846, 847, 849; 251/65
See application file for complete search history.

(56) References Cited

U.S. PATENT DOCUMENTS

| | | | | |
|---|---|---|---|---|
| 3,906,989 A | * | 9/1975 | Lamb | ................. B67D 1/0832 137/320 |
| 5,167,574 A | * | 12/1992 | Ikeda | ................. B60H 1/00664 137/512.1 |
| 6,382,255 B2 | | 5/2002 | McFarland | |
| 2001/0054448 A1 | * | 12/2001 | McFarland | ........... F16K 15/147 137/849 |

* cited by examiner

*Primary Examiner* — P. Macade Nichols
(74) *Attorney, Agent, or Firm* — Klintworth & Rozenblat IP LLP

(57) ABSTRACT

A check valve according to some embodiments of the disclosure includes a body forming a cavity and which defines an entrance opening, a wall extending from the body at an end opposite to the entrance opening, and rare-earth magnets attached to the wall. The body and wall are formed of a flexible and resilient material. The wall includes elongated wall portions joined together by end portions and a passageway extending from the cavity to a slit at the end of the wall. Interior surfaces of the wall portions abut against each other in an at rest condition, and the interior surfaces of the wall portions are separated from each other in a flow permitting condition such that the passageway is opened. The attractive force generated by the magnets cause the wall portions to move to the at rest condition.

18 Claims, 4 Drawing Sheets

CHECK VALVE

FIELD OF THE DISCLOSURE

The present disclosure a check valve for use primarily, but not essentially, in a toilet assembly, particularly, but not necessarily, of the type installed in land or water recreational vehicles.

BACKGROUND

Toilets assemblies on almost all modern boats and on recreational vehicles (RV) have to pump toilet waste into a holding tank which retains the waste until the waste can be safely emptied into an approved environmentally compliant waste facility. The conventional plumbing requires pumping the waste out and upward by a sanitation hose, which typically has a 1.5 inch inside diameter, upward about three to five feet, over a top loop, then the waste is allowed to flow downward into the holding tank where the waste is stored.

The upward loop is above the sea water line outside the vessel (boat) which isolates the inward flow of the sea in the event of a plumping failure. The upward loop also allows the waste to be isolated from the interior of the boat or RV in the event of toilet mechanism or hose failure. When on the open sea or ocean, waste discharge is permitted, but the waste must still be pumped up and over this upward loop, then down into the open sea or ocean.

Because there is always a 1.5 inch inside diameter sanitation hose flowing uphill against gravity three to five feet, this waste tends to backflow into the toilet bowel. To prevent this backflow, a check valve is installed at the toilet.

Prior art check valves for preventing such a backflow are made of made of elastomer rubber, typically neoprene. There are typically two styles, namely, a single valve sometimes called a "duck bill", and a tri-valve Y with three separate lobes. These prior art check valves seal based upon manufactured molded in stress. The prior art check valves tend to stretched out in use, and then lose elasticity. As a result, liquid waste leaks back into the toilet, which highly undesirable on a RV or on a boat.

Saltwater and seas contaminates can also interfere with the natural sealing of a check valve.

A check valve for use in toilet assembly of a RV or a boat is provided herein which provides improvements to the existing prior art and which overcomes the disadvantages presented by the prior art. Other features and advantages will become apparent upon a reading of the attached specification, in combination with a study of the drawings.

SUMMARY

A check valve according to some embodiments of the disclosure includes a body forming a cavity and which defines an entrance opening, a wall extending from the body at an end opposite to the entrance opening, and rare-earth magnets attached to the wall. The body and wall are formed of a flexible and resilient material. The wall includes elongated wall portions joined together by end portions and a passageway extending from the cavity to a slit at the end of the wall. Interior surfaces of the wall portions abut against each other in an at rest condition, and the interior surfaces of the wall portions are separated from each other in a flow permitting condition such that the passageway is opened. The attractive force generated by the magnets cause the wall portions to move to the at rest condition.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

BRIEF DESCRIPTION OF THE DRAWINGS

The organization and manner of the structure and operation of the disclosed embodiments, together with further objects and advantages thereof, may best be understood by reference to the following description, taken in connection with the accompanying drawings, which are not necessarily drawn to scale, wherein like reference numerals identify like elements in which.

DETAILED DESCRIPTION

Figure 1:
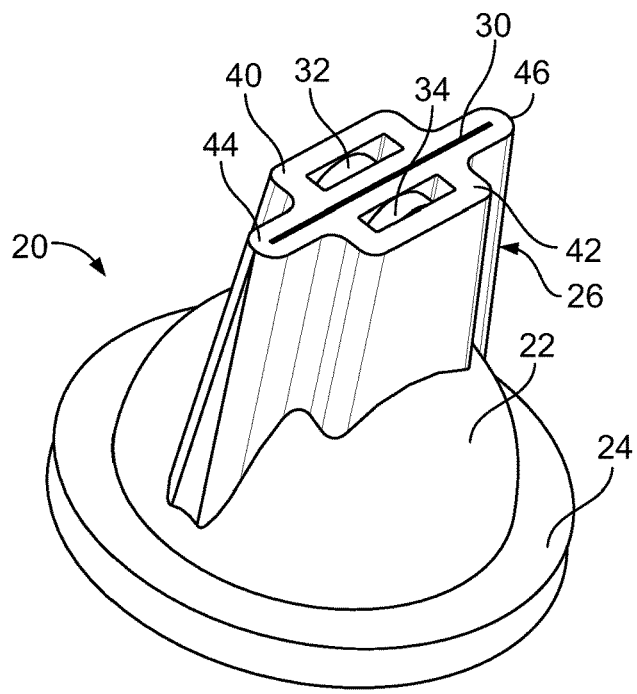
FIG. 1 is a perspective view of an embodiment of a check valve.

While the disclosure may be susceptible to embodiment in different forms, there is shown in the drawings, and herein will be described in detail, specific embodiments with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

Figure 2:
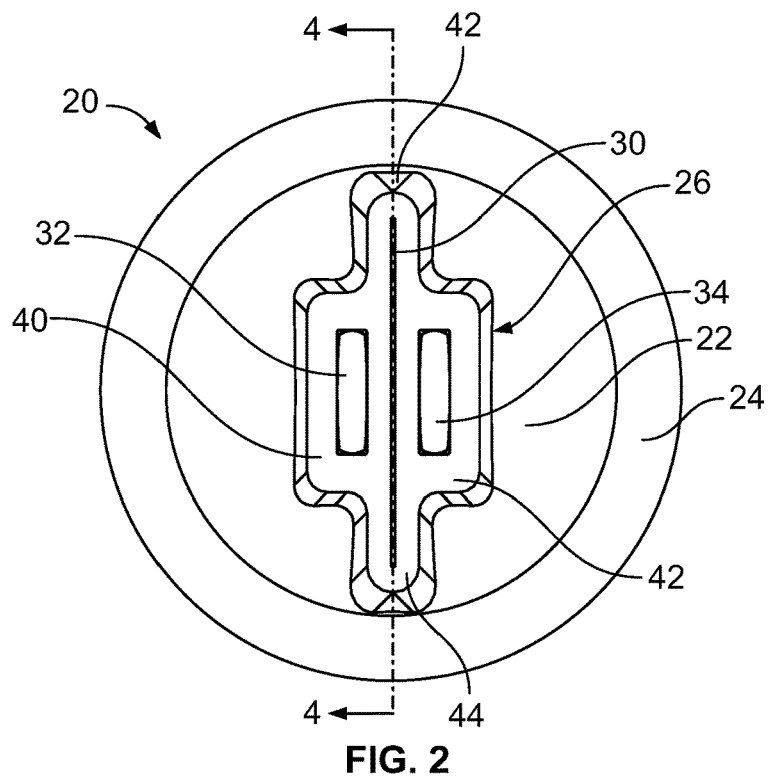
FIG. 2 is a top plan view of the check valve.
Figure 3:
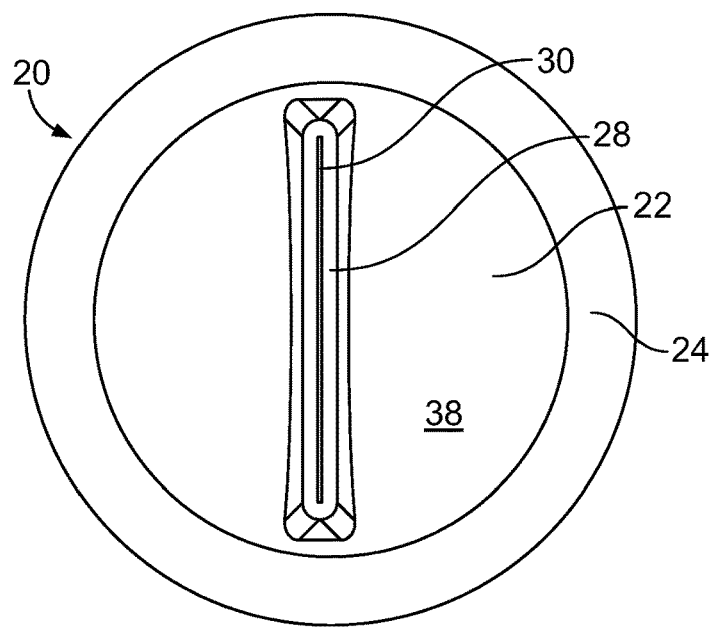
FIG. 3 is a top plan view of the check valve.
Figure 4:
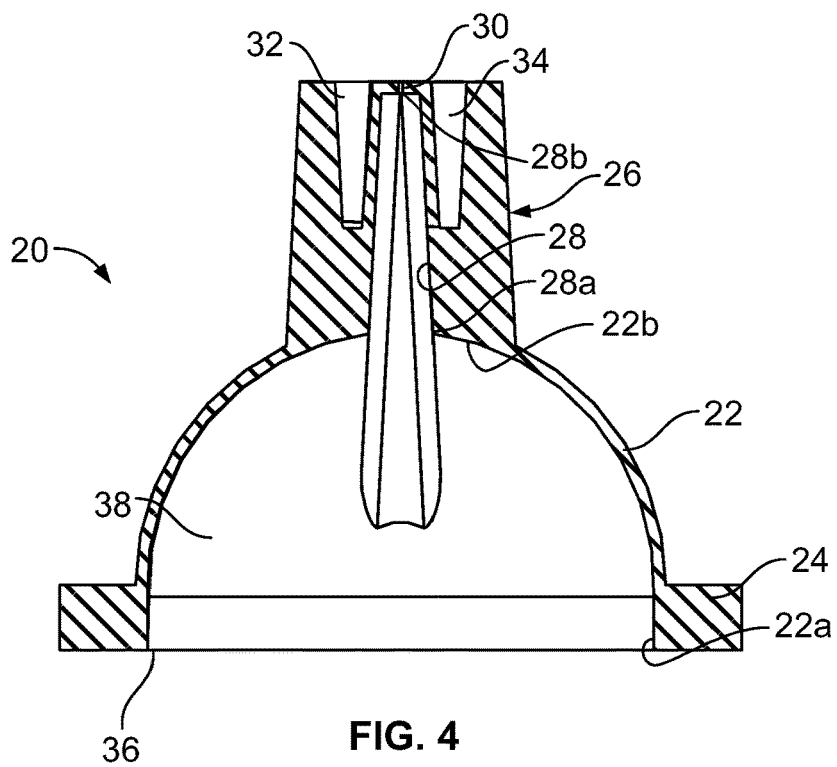
FIG. 4 is a cross-sectional view of the check valve along line 4-4 in FIG. 2.
Figure 5:
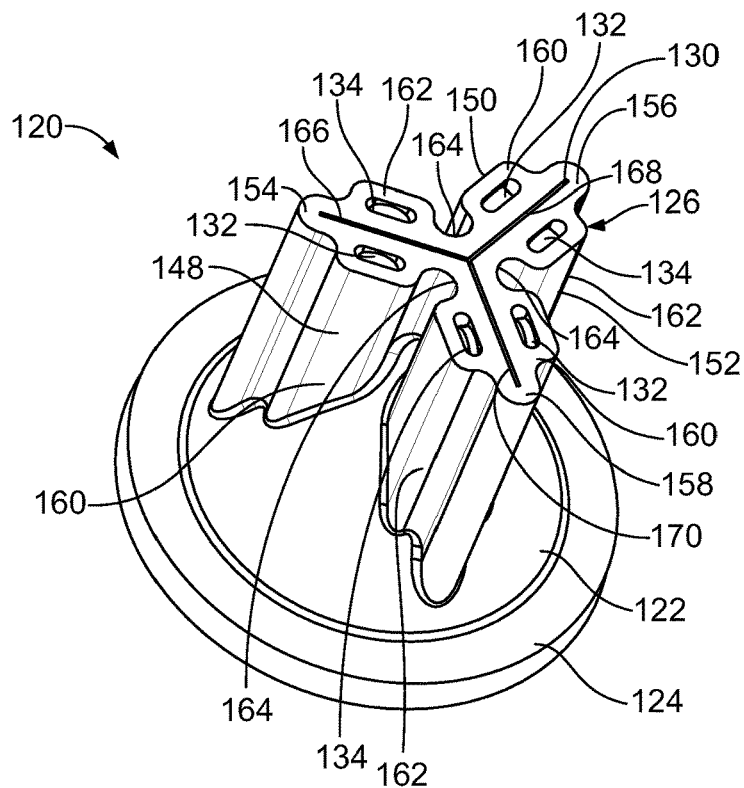
FIG. 5 is a perspective view of an alternate embodiment of a check valve.
Figure 6:
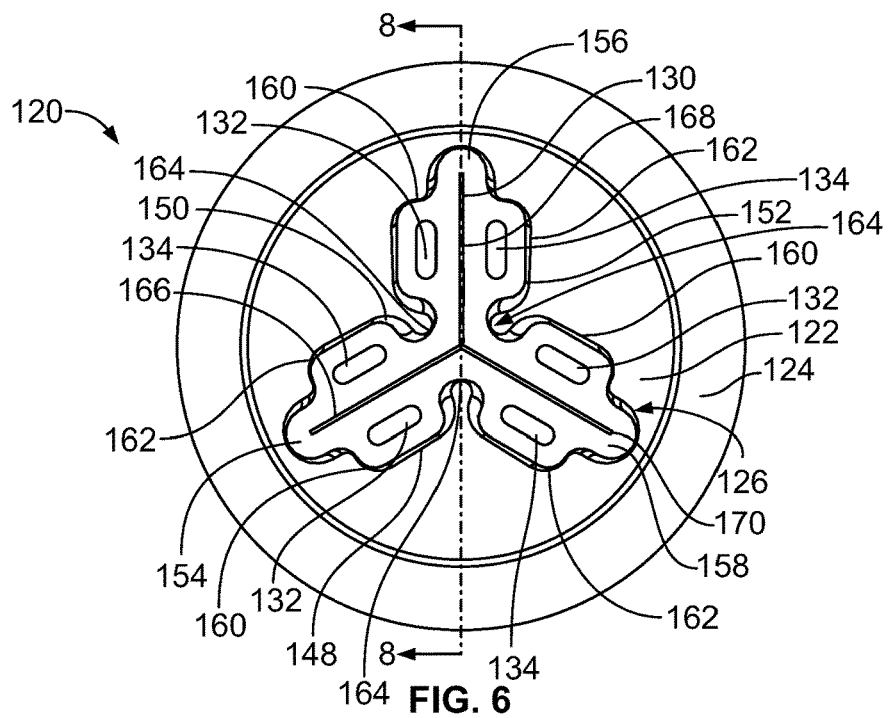
FIG. 6 is a top plan view of the check valve of FIG. 5.
Figure 7:
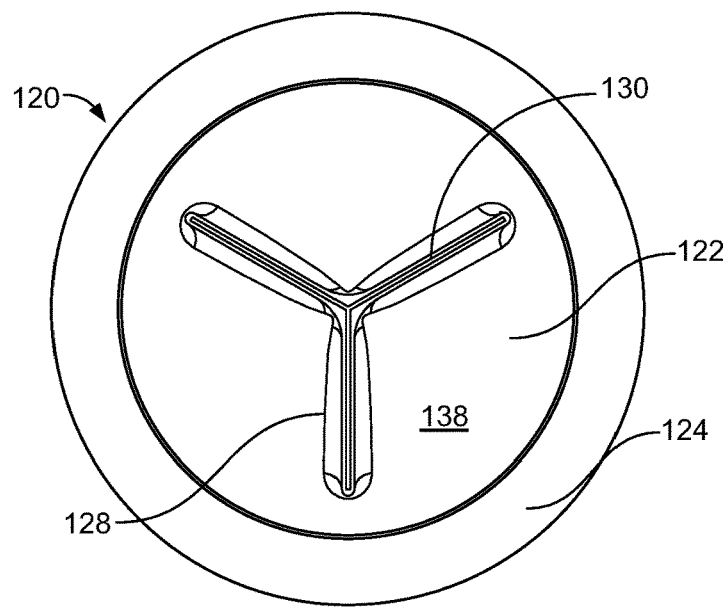
FIG. 7 is a top plan view of the check valve of FIG. 5.
Figure 8:
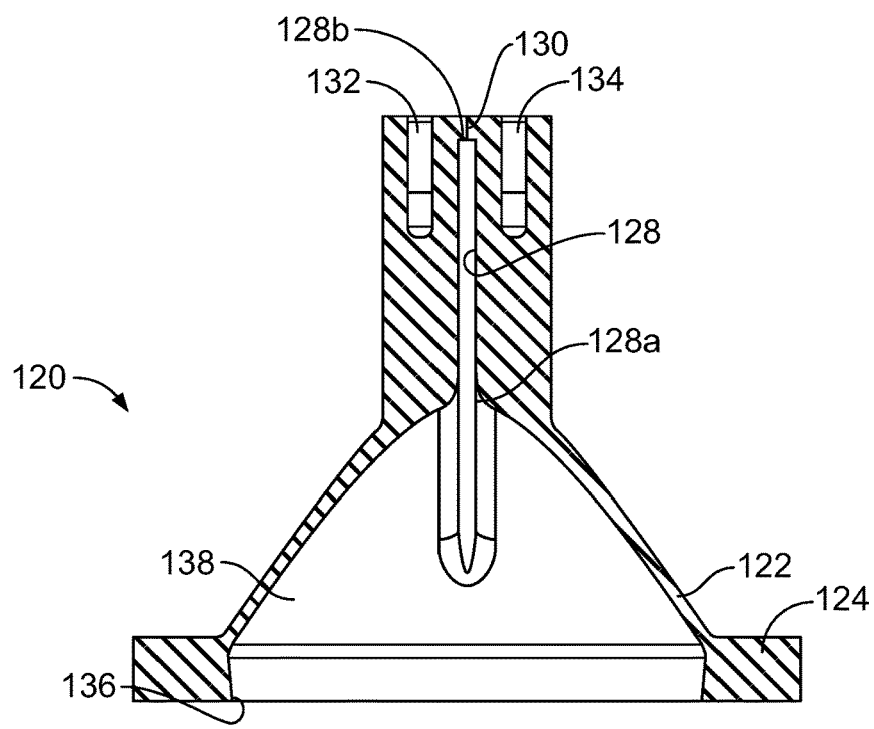
FIG. 8 is a cross-sectional view of the check valve along line 8-8 in FIG. 6.

A check valve 20, 120 is provided for use in a toilet assembly (not shown) installed in land or water recreational vehicles, for example recreational vehicles (RV) and boats. The check valve 20, 120 is seated within a pipe of the toilet assembly. A first embodiment of the check valve 20 is shown in FIGS. 1-4; and a second embodiment of the check valve 120 is shown in FIGS. 5-8.

The check valve 20, 120 includes a body 22, 122, a flange 24, 124 extending radially outwardly from a first end 22a, 122a of the body 22, 122, a wall 26, 126 extending from the body 22, 122 which has an expandable passageway 28, 128 therethrough and an expandable slit 30, 130 at the end of the passageway 28, 128, and pair of rare-earth magnets 32, 34, 132, 134 mounted on the wall 26, 126 on either side of the passageway 28, 128 and slit 30, 130. The body 22, 122, the flange 24, 124 and the wall 26, 126 is of a unitary molded construction and is formed of a suitable flexible and resilient material, such as rubber, which provides good sealing characteristics. The body 22, 122, the flange 24, 124 and the wall 26, 126 may be formed of an elastomeric material having a hardness of between 80° -90° shore. The flange 24, 124 engages and seals with the pipe of the toilet assembly.

The body 22, 122 may be dome-shaped, conical-shaped, cylindrical shaped and the like, having a tubular inlet 36, 136 at the first end 22a, 122a and which defines a cavity 38, 138 therein which extends from the inlet 36, 136 to the passageway 28, 128.

The wall 26, 126 extends from a second end 22b, 122b of the body 22, 122 which is opposite to the first end 22a, 122a. The passageway 28, 128 has an end 28a, 128a at the cavity 36, 136 which is wider than the end 28b, 128b at the slit 30, 130. In an at rest position, the slit 30, 130 is closed.

Attention is invited to the embodiment of the check valve 20 shown in FIGS. 1-4. The wall 26 is formed of a first and second elongated side wall portions 40, 42 which are joined together by end wall portions 44, 46. The passageway 28 and slit 30 separate the first side wall portion 40 from the second side wall portion 42, but the passageway 28 and slit 30 do not extend through the end wall portions 44, 46. In an embodiment, the passageway 28 and slit 30 extend in linear manner between the end wall portions 44, 46. In an at rest condition, interior surfaces of the side wall portions 40, 42 abut against each other at the slit 30 or at the end of the passageway 28, thereby forming a seal to prevent the passage of materials therethrough.

Attention is invited to the embodiment of the check valve 120 shown in FIGS. 5-8. The wall 126 is formed of three generally V-shaped side wall portions 148, 150, 152 joined together by end wall portions 154, 156, 158. Side wall portion 148 is joined to side wall portion 150 by end wall portion 154; side wall portion 150 is joined to side wall portion 152 by end wall portion 156; side wall portion 152 is joined to side wall portion 148 by end wall portion 158. Each side wall portion 148, 150, 152 is formed of first and second wall sections 160, 162 which are joined together by an intermediate wall section 164. The respective first and second wall sections 160, 162 are angled relative to each other. The first wall section 160 of wall 148 abuts against the second wall section 162 of wall 150; the first wall section 160 of wall 150 abuts against the second wall section 162 of wall 152; and the first wall section 160 of wall 162 abuts against the second wall section 162 of wall 148. The passageway 128 and slit 130 are formed in a Y-shape and has a first leg 166 that extends between first wall section 160 of wall 148 and the second wall section 162 of wall 150 but does not extend through the end wall portion 154, a second leg 168 that extends between the first wall section 160 of wall 150 and the second wall section 162 of wall 152 but does not extend through the end wall portion 156, and a third leg 170 that extends between the first wall section 160 of wall 162 and the second wall section 162 of wall 148 but does not extend through the end wall portion 158. The legs 166, 168, 170 are joined together at inner ends thereof. In an at rest condition, interior surfaces of the side wall portions 148, 150, 152 abut against each other at the slit 130 or at the end of the passageway 128, thereby forming a seal to prevent the passage of materials therethrough.

The check valve 20, 120 of the present disclosure includes the rare-earth magnets 32, 34, 132, 134 which are attached to the wall portions 40, 42, 148, 150, 152. In the embodiment shown in FIGS. 1-4, rare-earth magnet 32 is attached to wall portion 40 and rare-earth magnet 34 is attached to wall portion 42 and the magnets 32, 34 are aligned with each other and form a pair. In the embodiment shown in FIGS. 5-8, one rare-earth magnet 132 is attached to wall section 160 of wall portion 148 and one rare-earth magnet 134 is attached to wall section 162 of wall portion 150 and the magnets 132, 134 are aligned with each other and form a first pair; one rare-earth magnet 132 is attached to wall section 160 of wall portion 150 and one rare-earth magnet 134 is attached to wall section 162 of wall portion 152 and the magnets 132, 134 are aligned with each other and form a second pair; and one rare-earth magnet 132 is attached to wall section 160 of wall portion 152 and one rare-earth magnet 134 is attached to wall section 162 of wall portion 148 and the magnets 132, 134 are aligned with each other and form a third pair. In an embodiment, each rare-earth magnet 32, 34, 132, 134 is attached to the wall portion 40, 42, 148, 150, 152 proximate to the slit 30, 130. In an embodiment, each rare-earth magnet 32, 34, 132, 134 is embedded into the wall portion 40, 42, 148, 150, 152. In an embodiment, each rare-earth magnet 32, 34, 132, 134 is seated within a pocket in the wall portion 40, 42, 148, 150, 152. In an embodiment, each rare-earth magnet 32, 34, 132, 134 is surface attached to the wall portion 40, 42, 148, 150, 152 on the exterior surface thereof. In the embodiment shown in FIGS. 1-4, the rare-earth magnets 30, 32 are aligned with each other to form the pair and are attracted to each other (the opposite polarities are aligned as a pair) to ensure that the seal is maintained. In the embodiment shown in FIGS. 5-8, each pair of rare-earth magnets 130, 132 are aligned with each other and are attracted to each other (the opposite polarities are aligned as a pair) to ensure that the seal is maintained. The rare-earth magnets 32, 34, 132, 134 may be circular, rectangular, or torrid shape The rare-earth magnets 32, 34, 132, 134 may be assembled with the wall portions 40, 42, 148, 150, 152 during the molding process (insert molding) as single operation; may be assembled with the wall portions 40, 42, 148, 150, 152 in a post molding attachment by adhesive, a mechanical attachment, inserted into pre-molded pockets, post molded heat staking, and the like.

The check valve 20, 120 changes from the at rest condition to a flow permitting condition when waste material under pressure passes through the check valve 20, 120. To change to the flow permitting condition, waste material under pressure enters the check valve 20, 120 by passing into and through the inlet 36, 136. The waste material under pressure then flows through the cavity 38, 138. To exit the check valve 20, 120, the waste material under pressure flows through the passageway 28, 128 and exits the check valve 20, 120 through the slit 30, 130. Since the wall 26, 126 is formed of a flexible and resilient material, the passageway 28, 128 and the slit 30, 130 can be expanded as necessary when pressure is exerted on the wall 26, 126 by the pressurized waste material, thereby allowing the waste material under pressure to pass therethrough. The side wall portions 40, 42 move away from each other and the end wall portions 44, 46 move toward each other to enlarge the passageway 28 and slit 30 when necessary. After the waste material passes through the opened passageway 28 and slit 30, the side wall portions 40, 42 move toward each other, and the end wall portions 44, 46 move away from each other, until the interior surfaces of the side wall portions 40, 42 abut against each other to reform the seal. The side wall portions 148, 150, 152 move away from each other and the end wall portions 154, 156, 158 move toward each other to enlarge the passageway 128 and slit 130 when necessary. After the waste material passes through the opened passageway 128 and slit 130, the side wall portions 148, 150, 152 move toward each other, and the end wall portions 154, 156, 158 move away from each other, until the interior surfaces of the side wall portions 148, 150, 152 abut against each other to reform the seal.

The pressure exerted on the walls 26, 126 by the pressurized waste material is sufficient to overcome the force of the magnetic attraction between the pair or pairs of rare-earth magnets 30, 32, 130, 132 which then causes the passageway 28 and slit 30 to expand. After the waste material passes through the opened passageway 28 and slit 30 or the pressure acting on the waste material drops below a predefined level, the magnetic attraction of the pair or pairs of rare-earth magnets 30, 32, 130, 132 is no longer overcome. This causes the side wall portions 40, 42 to move toward each other and the end walls 44, 46 to move away from each other to reform the seal, or the side wall portions 148, 150, 152 to move toward each other and the end walls 154, 156, 158 to move away from each other to reform the seal. The rare-earth magnets 30, 32, 130, 132 provide a very high attractive force which quickly, with distance, is reduced dramatically. This allows for a pumping motion which permits easy passage of the waste material. Rare-earth magnets 30, 32, 130, 132 are also cost effective.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

What is claimed is:

1. A check valve comprising:
    a dome-shaped body forming a cavity and which defines an entrance opening;
    a wall extending from the body at an end opposite to the entrance opening, the wall comprising elongated wall portions joined together by end portions, a passageway between the wall portions and extending from the cavity to a slit at an end of the wall, wherein interior surfaces of the wall portions abut against each other in an at rest condition, and wherein the interior surfaces of the wall portions are separated from each other in a flow permitting condition such that the passageway and slit are opened, the body and wall being formed of a flexible and resilient material; and
    at least one rare-earth magnet attached to each wall portion.

2. The check valve of claim 1, further comprising a flange extending outwardly from the body proximate to the entrance opening.

3. The check valve of claim 1, wherein the rare-earth magnets are seated in pockets in the wall portions.

4. The check valve of claim 1, wherein the rare-earth magnets are adhesively attached to the wall portions.

5. The check valve of claim 1, wherein the body and the wall are formed of an elastomeric material.

6. The check valve of claim 5, wherein the elastomeric material has a hardness of between 80°-90° shore.

7. The check valve of claim 1, wherein the passageway is linear.

8. The check valve of claim 1, wherein the passageway is Y-shaped.

9. The check valve of claim 1, wherein each wall portion is generally V-shaped.

10. A check valve comprising:
    a body forming a cavity and which defines an entrance opening;
    a wall extending from the body at an end opposite to the entrance opening, the wall comprising elongated wall portions joined together by end portions, a passageway between the wall portions and extending from the cavity to a slit at an end of the wall, wherein interior surfaces of the wall portions abut against each other in an at rest condition, and wherein the interior surfaces of the wall portions are separated from each other in a flow permitting condition such that the passageway and slit are opened, the body and wall being formed of a flexible and resilient material; and
    at least one rare-earth magnet attached to each wall portion, the rare-earth magnets seated in pockets in the wall portions.

11. The check valve of claim 10, further comprising a flange extending outwardly from the body proximate to the entrance opening.

12. The check valve of claim 10, wherein the body is dome shaped and further comprising a flange extending radially outwardly from the body proximate to the entrance opening.

13. The check valve of claim 10, wherein the body and the wall are formed of an elastomeric material.

14. The check valve of claim 13, wherein the elastomeric material has a hardness of between 80°-90° shore.

15. The check valve of claim 10, wherein the passageway is linear.

16. The check valve of claim 10, wherein the passageway is Y-shaped.

17. The check valve of claim 10, wherein each wall portion is generally V-shaped.

18. The check valve of claim 10, wherein each pocket is open ended.

* * * * *